United States Patent [19]
Pery et al.

[11] Patent Number: 5,134,492
[45] Date of Patent: Jul. 28, 1992

[54] METHOD AND DEVICE FOR LIMITING THE CURRENT OF A CATHODE-RAY TUBE DURING THE FRAME RETURN TIME

[75] Inventors: Antoine Pery, Strasbourg; Patrick Douziech, Rosheim, both of France

[73] Assignee: Laboratoire Europeen De Recherches Electroniques Avancees Societe En Nom Collectif, Courbevoie, France

[21] Appl. No.: 637,635

[22] Filed: Jan. 4, 1991

[30] Foreign Application Priority Data

Jan. 16, 1990 [FR] France .................. 90 00433

[51] Int. Cl.[5] .................. H04N 5/68; H04N 5/57
[52] U.S. Cl. .................. 358/243; 358/168; 358/169; 315/380
[58] Field of Search ............ 358/243, 242, 168, 169, 358/217; 315/380, 384, 408

[56] References Cited

U.S. PATENT DOCUMENTS

| | | | |
|---|---|---|---|
| 3,735,039 | 5/1973 | Trzyna | 358/243 |
| 3,914,545 | 10/1975 | Engel | 358/169 |
| 4,253,110 | 2/1981 | Harwood et al. | 358/74 |
| 4,298,885 | 11/1981 | Okada | 358/243 |
| 4,521,811 | 6/1985 | Stoughton et al. | 358/243 |
| 4,553,156 | 11/1985 | Douziech | 358/24 |
| 4,561,014 | 11/1985 | Douziech | 358/25 |
| 4,644,388 | 2/1987 | Douziech | 358/23 |
| 4,996,590 | 2/1991 | Okamoto et al. | 358/243 |

OTHER PUBLICATIONS

IBM Technical Disclosure Bulletin, vol. 27, No. 3 Aug. 1984, pp. 1766-1768, N.Y., U.S.; C. J. Ling et al.: "Automatic brightness control for CRT".

Primary Examiner—John K. Peng
Attorney, Agent, or Firm—Oblon, Spivak, McClelland, Maier & Neustadt

[57] ABSTRACT

A limiter device essentially includes a comparator connected to a capacitor charged by a current proportional to the beam current and short-circuited by pulses during one line just after the frame return pulses. This comparator receives a threshold voltage and its output is connected to a capacitor connected to another reference voltage, and this comparator is validated by the frame return pulses.

6 Claims, 1 Drawing Sheet

METHOD AND DEVICE FOR LIMITING THE CURRENT OF A CATHODE-RAY TUBE DURING THE FRAME RETURN TIME

BACKGROUND OF THE INVENTION

1. Field of the Invention

The present invention relates to a method and a device for limiting the current of a cathode-ray tube.

2. Description of the Prior Art

Television receivers are fitted out with an average beam current limiter (or ABCL) system making it possible to obtain sufficiently luminous pictures (in terms of contrast and light), inasmuch as the current remains below a certain limit (for example 1.2 mA). The ABCL further makes it possible to reduce the content of the picture (generally the contrast and/or the light) when the image that would be obtained without this system implies a beam current which, in the long term, would prompt a premature ageing of the cathode-ray tube.

To this end, the beam current is determined, for example either by detecting the mean current at the base of the EHV (extra-high voltage) source or by measuring the sum of the instantaneous currents of each cathode and by integrating it.

The time constant in every case should be:

short enough so that a sudden transition in the picture content does not prompt an excessive current (some mA) for an excessively long time (for the duration of some frames) in such a way that the EHV source can give the corresponding energy (and also so that the tube is not subjected to excessively high light intensities);

long enough for the light and contrast (or even saturation) levels to remain practically unchanged during a frame. This is particularly difficult to achieve when the upper half of an image is white (or black) and the lower half is black (or white respectively).

SUMMARY OF THE INVENTION

An object of the present invention is a method enabling the beam current of a cathode-ray tube to be limited efficiently in every possible case, especially for sudden transitions in the picture content.

Another object of the invention is a device, for implementing the method of the invention, that is simple and inexpensive, and easy to make in integrated circuit form.

The method according to the invention consists in modifying the contrast and/or light commands of the cathode-ray tube solely during the frame return time. According to one aspect of the method of the invention, should the beam current exceptionally go beyond a threshold above which the components of the television receiver might be damaged, this current is immediately limited for as long as it tends to go beyond said threshold.

The device according to the invention includes a circuit for the measurement of the, possibly weighted, sum of the currents of the cathodes of the cathode-ray tube, connected to an input of a comparator to which there is also connected a capacitor in parallel with a switch controlled by a circuit generating control pulses on the basis of frame return pulses, another input of the comparator being connected to a reference voltage, the output of the comparator being connected to a second capacitor which is connected, through a diode, to a reference voltage, the output of the comparator being also connected to the light and/or contrast control circuits of the cathode-ray tube, the enable input of the comparator receiving frame return pulses.

BRIEF DESCRIPTION OF THE DRAWINGS

The present invention will be understood more clearly from the following detailed description of an embodiment, taken as a non-restrictive example and illustrated by the appended drawing, wherein.

DETAILED DESCRIPTION OF THE INVENTION

Figure 1:
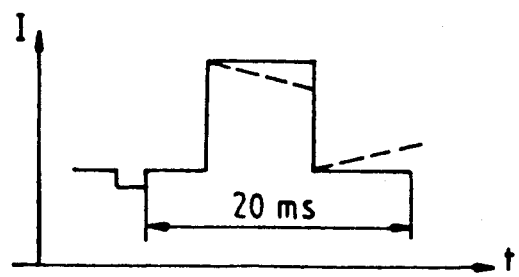
FIG. 1 is a timing diagram pertaining to the current limiter circuits of the prior art.

In FIG. 1, a solid line is used to depict a part of a video signal corresponding to a picture, half of which is black while the other half is white. In this example, the upper half of the picture is white (maximum video level) and the lower half is black (zero video level). Dashes are used to show the action of the known ABCL circuit, namely the effect of light and/or contrast reduction during the first 10 ms of the video signal, and the effect of increase of light and/or contrast during the rest of the picture, when the ABCL circuit stops acting.

Consequently, the effect on the picture can be likened to a differentiation of the video signal.

Figure 4:
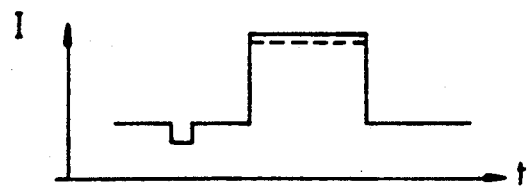
FIG. 4 is a timing diagram showing the action of the circuit of FIG. 2.

By contrast, through the method of the invention, under the same conditions, a constant reduction is obtained in the level of the white and there is no action on the level of the black (see FIG. 4). This method of the invention consists in modifying the action of the beam current limiter circuit only during the frame return and in not modifying its action throughout the scanning of a frame. This eliminates the above-mentioned differentiation effect while, at the same time, enabling fast action in case of need, for example during a sudden change in the picture content.

Figure 2:
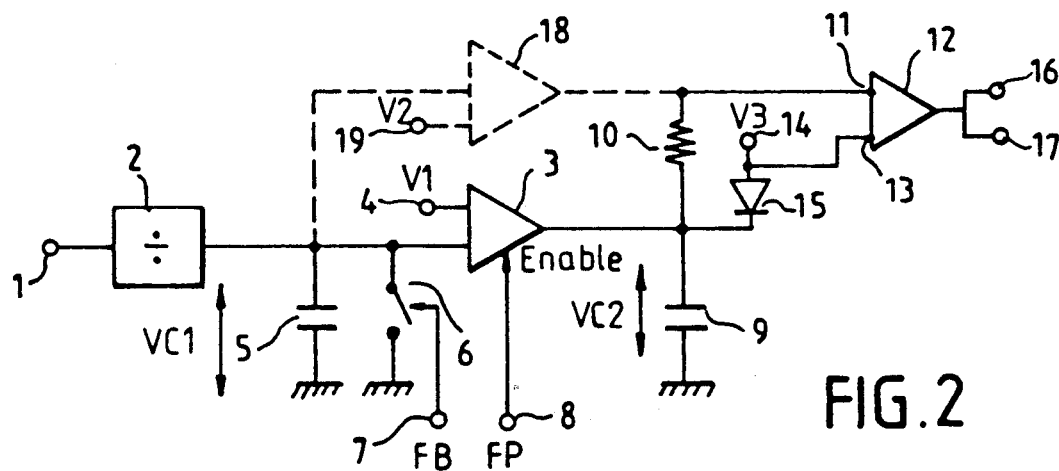
FIG. 2 is a simplified diagram of a current limiter circuit according to the invention.

FIG. 2 shows the diagram of an embodiment of a circuit implementing this method. The input terminal 1 of this circuit receives a current proportional to the beam currents of the three guns of the cathode-ray tube. Advantageously, the components of this sum may be weighted differently from one another. Of course, in the case of a monochromatic tube, this sum amounts to the current of the single beam of this tube. This terminal may be connected to the collectors of the transistors which are generally mounted as emitter/follower devices between the voltage outputs of the final video stages and the cathodes of the guns of the trichromatic cathode-ray tube (of course, if it were to be a monochromatic tube, only the current of its single cathode would be tapped).

The terminal 1 is connected to a current divider 2, the division ratio of which is, for example, 1/100. The output of the divider 2 is connected to an input of a comparator 3 set up by means of a linear operational amplifier, the other input 4 of which receives a reference voltage V1. The output of the divider 2 is also connected to an electrode of a capacitor 5, the other electrode of which is connected to the ground. A control switch 6 is parallel-connected with the capacitor 5.

Figure 3:
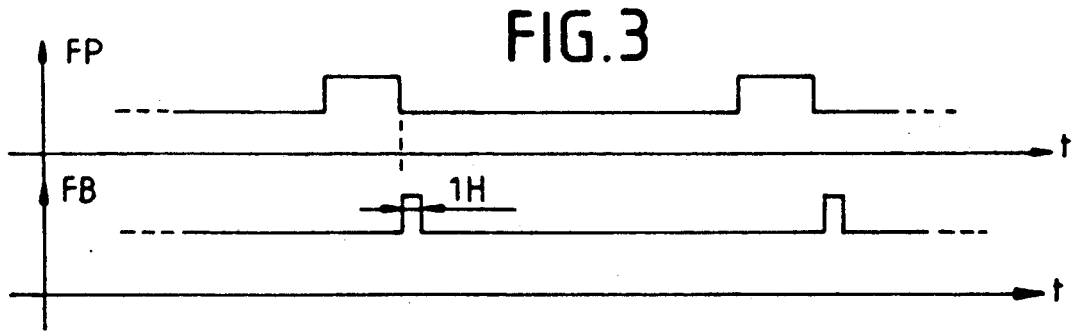
FIG. 3 is a timing diagram of signals used in the circuit of FIG. 2.

The control input of this switch 6 is connected to a terminal 7 receiving pulses FB illustrated in FIG. 3. The pulses FB command the closing of the switch 6, hence the short-circuit and the discharging of the capacitor 5. The enable input of the amplifier 3 is connected to a terminal 8 receiving the frame return pulses FP. As shown in FIG. 3, the pulses FB have a duration equal to the scan time for one line, and their rising edge arrives practically simultaneously with the descending edge of the pulses FP. These pulses FB may be produced, for example, by a monostable trigger circuit triggered by the descending edge of FP.

The current output of the amplifier 3 is connected, firstly, to the ground by means of a capacitor 9 and, secondly, through a resistor 10, to a first input 11 of a comparator 12. The second input 13 of the comparator 12 is connected to a terminal 14 receiving a reference voltage V3. The terminal 14 is connected to the anode of a diode 15, the cathode of which is connected to the common point of the resistor 10 and of the capacitor 9. The output of the comparator 12 is connected to two terminals 16, 17. The terminal 16 is connected to the contrast control circuit of the cathode-ray tube, and the terminal 17 is connected to the luminosity control circuit of this cathode-ray tube. These control circuits are well-known per se and are not shown in the drawing.

In FIG. 2, dashes are used to depict a security circuit which may be advantageously adjoined to the above-described limiter circuit. This additional circuit has a comparator 18, one input of which is connected to the output of the divider 2, while the other input is connected to a terminal 19 receiving a reference voltage V2. The current output of the comparator 18 is connected to the input 11 of the comparator 12.

The circuit of FIG. 2 works as follows. The capacitor 5 gets discharged at the end of each frame return (with the closing of the switch 6 by the pulses FB) and is charged during the frame forward scan by a current coming from the divider 2, proportional to the total instantaneous beam current. Of course, should the television receiver be fitted out with a circuit such as that of FIG. 2, for each of the beams of a trichromatic tube, the charging current of the capacitor 5 is proportional to the total instantaneous beam current. During the return frame, the voltage VC1 presented at the terminals of the capacitor 5 is compared with the reference voltage V1. The capacitor 9 is charged (or discharged) by a current proportional to the algebraic difference VC1−V1. So long as VC1<V1, the capacitor 9 is discharged. The voltage VC2 at the terminals of the capacitor 9 is equal to V3−VD, VD being the voltage drop due to the diode 15. As soon as VC1 goes beyond V1, the capacitor 9 is charged by a current proportional to VC1−V1. If the voltage VC2 goes beyond V3, the outputs 16 and 17 of the comparator 12 are activated, and the contrast and/or luminosity reduction commands come into action.

The circuit is stable when VC2 remains constant. This is true for VC1=V1. The beam current limiting threshold is defined for this latter equation. This threshold can be fixed by choosing the value of the capacitor 5 for each application considered. The value of the capacitor 9 determines the time constant of the circuit. If this value is too small, the circuit oscillates, for the action of reduction is greater than than what is necessary and is therefore immediately followed by an action in the reverse direction (an increase in the beam current); if this value is too high, the circuit gets stabilized at the end of a large number of frames, and is therefore not efficient in time. The right choice of the value of the capacitor 9 corresponds to the obtaining of an equilibrium in a time included between the duration of one and two frames. In one embodiment, the values of the capacitors 5 and 9 are about 100 nF.

The comparator 18 is used when it is desired to obtain a faster action on the light and/or contrast when a second threshold V2, greater than V1 and V3, is crossed, i.e. when it is estimated that the time constant due to the capacitor 9 is too high in the case considered.

As a consequence, as soon as the voltage VC1, due to an excessively high beam (greater than a few milliamperes) exceeds the threshold V2, the comparator 18 immediately commands the comparator 12 (since V2>V3 and since there are no time constant circuits that would delay the control of the comparator 12 by the comparator 18) which, in its turn, immediately commands the reduction of the light and/or contrast of the cathode-ray tube. Clearly, the value of the threshold V2 is such that the comparator 18 comes on only in the case of an exceptional increase in the beam current, that would endanger the components of the television receiver.

What is claimed is:

1. A method for limiting the beam current of a cathode-ray tube operating in response to contrast control commands and light control commands and having a frame scanning time and a frame return time, said method comprising the steps of:
   providing signals indicative of said frame return time; and
   modifying at least one of said contrast control and said light control commands solely during the frame return time.

2. A method according to claim 1, further comprising the step of:
   limiting said beam current when the value of the beam current exceeds a predetermined threshold value.

3. A device for limiting the beam current of a cathode-ray tube having a scanning time and a frame return time, said cathode-ray tube further having contrast control circuitry and light control circuitry, said device including a means for receiving a signal representing a sum of cathode currents of said cathode-ray tube and providing a proportional output which is connected to an input of a comparator to which there is also connected a capacitor in parallel with a switch controlled by a circuit generating control pulses on the basis of frame return pulses, another input of the comparator being connected to a reference voltage, the output of the comparator being connected to a second capacitor which is connected, through a diode, to a reference voltage, the output of the comparator providing at least one of a light reduction and contrast control reduction commands, the enable input of the comparator receiving frame return pulses.

4. A device according to claim 3, wherein the components of the sum of the currents of the cathodes are weighted differently from one another.

5. A device according to claim 3, including another comparator, the input of which is connected to a reference voltage greater than the above-mentioned reference voltages, the other input of which is connected to the first capacitor, and the output of which is connected to said at least one light and contrast control circuits of said cathode-ray tube.

6. A device according to claim 3, wherein the value of the second capacitor is such that it makes it possible to obtain the stabilization of the device in a time between one and two frames.

* * * * *